United States Patent [19]

Sakakibara et al.

[11] Patent Number: 4,559,864
[45] Date of Patent: Dec. 24, 1985

[54] ACTUATOR

[75] Inventors: Naoji Sakakibara; Hiroyuki Amano, both of Kariya; Hiroaki Morioka, Toyota; Shoji Kawata, Okazaki, all of Japan

[73] Assignee: Aisin Seiki Kabushiki Kaisha, Kariya, Japan

[21] Appl. No.: 594,640

[22] Filed: Mar. 29, 1984

[30] Foreign Application Priority Data

Mar. 29, 1983 [JP] Japan .................................. 58-52929

[51] Int. Cl.⁴ ............................................. F15B 11/08
[52] U.S. Cl. ...................................... 91/454; 91/459; 123/360; 361/383
[58] Field of Search ................. 91/454, 456, 457, 459; 137/625–665, 338; 123/360; 361/383; 200/83 R, 83 Q

[56] References Cited

U.S. PATENT DOCUMENTS 4,006,724 2/1977 Carter .............................. 123/198 E
4,249,457 2/1981 Sakakibara ........................ 91/459 X Primary Examiner—Edward K. Look
Attorney, Agent, or Firm—Sughrue, Mion, Zinn, Macpeak & Seas

[57] ABSTRACT

An actuator for controlling the pressure in an internal space defined by a spring-biased diaphragm and a housing by solenoid valve. The internal space is selectively communicated with a negative pressure port or an atmospheric pressure port through a first solenoid valve. The pressure in the internal space is determined by the ratio of a time period in which it is communicated with the negative pressure port to a time period in which it is communicated with the atmospheric pressure port, and the position of the diaphragm is determined accordingly. Another solenoid valve for releasing negative pressure is included for safety. To the housing fixed are a microcomputer for receiving status signals from a vehicle speed sensor, clutch ON/OFF sensor, brake ON/OFF sensor, etc. to generate a solenoid valve opening and closing signal, and a printed board incorporating an electrical driver adapted to energize the solenoid valve in response to said signal. A fluid flowing passage communicating one of the atmospheric pressure port and the negative pressure port with the internal space port is formed between the bottom wall of a housing base and the printed board. Air flowing into and out of the internal space through the fluid flowing passage serves to bring away the heat from the printed board.

3 Claims, 10 Drawing Figures

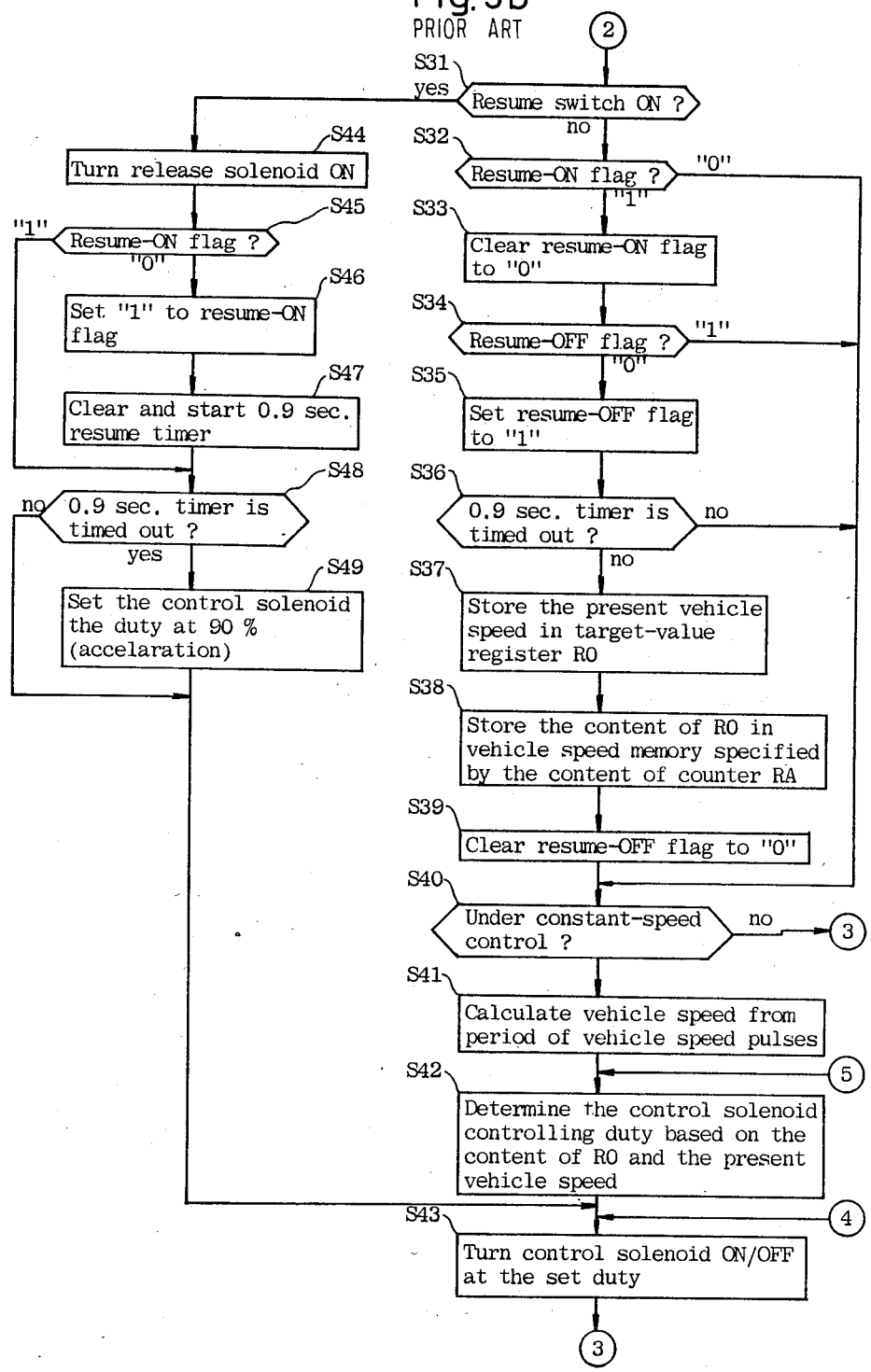

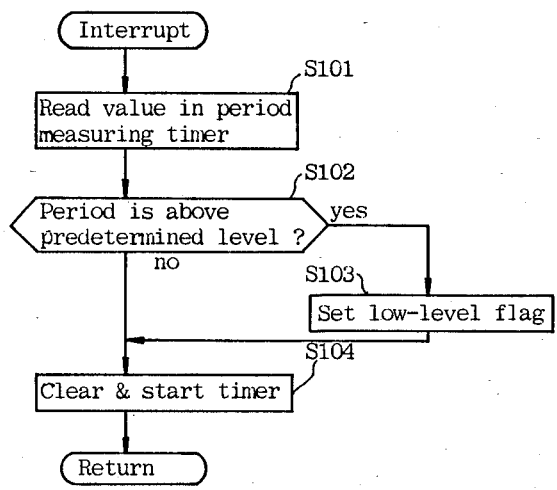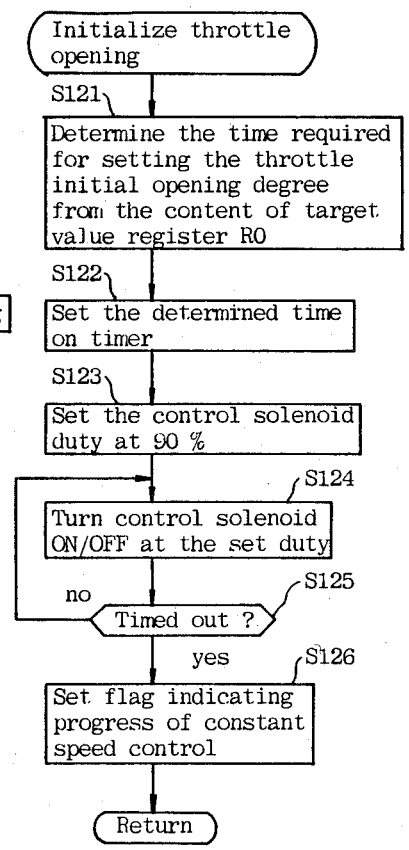

ACTUATOR

BACKGROUND OF THE INVENTION

The present invention relates to an actuator, and more particularly, to a fluidly driven actuator which comprises a solenoid control valve and a diaphragm, the diaphragm being determined in its position by fluid pressure controlled by the solenoid control valve.

One example of this kind actuator is disclosed in this Japanese Patent Application No. 34268/1983. This actuator is used in a vehicle speed controller adapted to store a speed of the vehicle for maintaining the vehicle speed at the stored one in an automatic manner.

An electrical circuitry of the vehicle speed controller is shown in FIG. 1. Referring to FIG. 1, an electronical control device 10 is composed of a single chip microcomputer CPU and interface circuits. An runaway detecting circuit 20 is connected to a reset port RESET of the CPU. A vehicle speed detecting lead switch SW2, a clutch switch SW3, a stop switch SW4, a set switch SW5 and a resume switch SW6 are respectively connected to an external interrupt input port IRQ and input ports $K_2$, $K_3$, $K_0$ and $K_1$ through interface circuits IF1, IF2, IF3, IF4 and KF5.

In the vicinity of the vehicle speed detecting lead switch SW2 there is arranged a permanent magnet connected to a speed meter cable (not shown), so that the contact of the vehicle speed detecting lead switch SW2 is opened and closed as the permanent magnet rotates upon movement of the vehicle. When the contact of the SW2 is changed from the closed state to the opened state, an output level of the interface circuit IF1 assumes a low level L and the microcomputer CPU receives an interrupt demand.

The clutch switch SW3 is opened and closed in interlock relation with a clutch pedal of the vehicle, while the stop switch Sw4 is opened and closed in interlock relation with a brake pedal. To the stop swtich SW4 is connected a stop lamp STL which is lit up in the ON (closed) state of the SW4.

Both the set switch SW5 and resume switch SW6 are of push botton switches and disposed on an instrument panel in such positions as convenient for the driver to operate them.

An output port $O_0$ of the microcomputer CPU is connected to the runaway detecting circuit 20, and output ports $O_2$ and $O_3$ thereof are connected to solenoid drivers DV1 and DV2, respectively. To an output of the solenoid driver DV1 is connected a negative pressure control solenoid $SL_1$ of a later-described actuator (100), while to an output of the solenoid driver DV2 is connected a negative pressure release solenoid $SL_2$ thereof.

The voltage from a vehicular battery is applied via an ignition key switch SW1 to the negative pressure control solenoid $SL_1$, the negative pressure release solenoid $SL_2$, and a constant-voltage power supply circuit 30 for producing a constant voltage Vcc. A circuit 40 denotes an interrupt driver for use in energyzing the negative pressure release solenoid $SL_2$ independently of operation of the CPU, when the brake is effected.

FIG. 2 shows a construction of an actuator 100 controlled by the electrical circuitry shown in FIG. 1. Referring now to FIG. 2, a housing 101 mainly comprises a housing base 101a and a housing cover 101b. A diaphragm 102 is held between confronting flange portions of the base 101a and the cover 101b so as to divide an internal space of the housing 101 into two chambers. A first internal space 11a defined by the diaphragm 102 and the housing base 101 serves as negative pressure chamber, and a second internal space 11b defined by the diaphragm 102 and the housing cover 101b is communicated with the atmosphere through an opening of the housing cover 101b. A compression coil spring 103 is accommodated in the second internal space 11b. The spring 103 is interposed between a holder plate 12 for supporting the valve device and the diaphragm 102. When the pressure in the negative pressure chamber 11b is near atmospheric pressure, the spring 103 pushes the diaphragm 102 in a direction in which the second internal space 11b is narrowed and brings it into a position substantially indicated by phantom lines. A rod 104 fixed to the nearly central part of the diaphragm 102 extends to penetrate through the housing cover 101b. A link of a throttle valve 105 is operatively connected to the rod 104. The housing base 101a is formed with a negative pressure intake port 107 in communication with an intake manifold 106, as well as atmosphere intake ports 108 and 109.

Designated at the reference numeral 110 is a negative pressure control valve and at 111 is a negative pressure release valve, both valves being supported by the holder plate 12 fixed to the housing 101a. A movable piece 112 of the negative pressure control valve 110 is tiltable about P, and it has one end connected to an extension coil spring 113 and the other end located opposite to the control solenoid $SL_1$. Both ends of the movable piece 112 function as valve bodies which, in response to energization or deenergization of the solenoid $SL_1$, cause the negative pressure intake port 107 to be opened and the atmosphere intake port 108 to be closed (the state illustrated) or cause the negative pressure intake port 107 to be closed and the atmosphere intake port 108 to be opened.

The negative pressure release valve 111 is also supported by the holder plate 12 and comprises, similarly to the negative pressure control valve 110, a movable piece 114, an extension coil spring 115 and the solenoid $SL_2$. In response to energization or deenergization of the $SL_2$, the movable piece 114 makes the atmosphere intake port 109 closed (the state illustrated) or open, respectively. Incidentially, designated at 116 is an accelerator pedal, and at 117 is an extension coil spring.

The conventional actuator is constructed as stated above and driven by the electronical control device 10 as shown in FIG. 1.

Control operation of the microcomputer CPU in FIG. 1 is shown in FIGS. 3a, 3b, 3c, 3d and 3e. By referring to these figures, the operation of the CPU will be explained in order. It is to be noted that, when the vehicle moves, the lead switch SW2 always repeats its ON/OFF operation and the microcomputer CPU executes the external interrupt processing as shown in FIG. 3d at each time the SW2 is turned OFF.

First, turning-on of the power effects the initial setting. That is, the output ports are set at their initial levels and the content of each memory is cleared.

The level of the output port $O_0$ is inverted. That is, the level of the port $O_0$ is set at a low level L when it was set at a high level H, and is set at a high level H when it was set at a low level L. This processing is to be surely executed once within a predetermined time if the CPU is under the normal operation, whereby a pulse signal of almost constant period is applied to the runaway detecting circuit 20 from the CPU. When the pulse signal is applied, the runaway detecting circuit 20 sets an output level of a comparator CP at H and turns a transistor Q1 ON, thus causing a RESET terminal of the CPU to assume a high level H. If the CPU should make a runaway or the like and produce no pulse at the port $O_0$, the output level of the comparator CP is inverted to L, so that the transistor Q1 is turned OFF and a low level L is applied to the reset terminal RESET of the CPU. When the reset terminal RESET assumes L, the CPU performs the same operation as that at the time of power-off. As a result, such a runaway is surely stopped.

Under the normal operation, the CPU reads levels of the input ports $K_0$, $K_1$, $K_2$, $K_3$, etc., and it judges operations of the switches or the like and then executes the processing in accordance with the judged switch operations as follows.

In case there is no change in the inputs (except for the case any of timers, flags, etc. is set), the CPU executes the processing loop passing through the steps S2-S3-S-4-S42-S43 and then returning back to the step S2 after execution of plural stored routines as shown in FIG. 3c. In this case, the content of a vehicle speed memory, a target value register, flags, etc. remains unchanged.

When the clutch switch SW3 or the stop switch SW4 is turned ON, or when the vehicle speed is lowered less than a predetermined value (e.g., 30 km/h), the level of the output port is set in a direction where the solenoid is not energized, and the content of the target value register R0 is cleared to release the constant-speed control. Also, flags or the like are all cleared. This releases the constant-speed traveling mode when it was set. In addition, the release solenoid $SL_2$ is so deenergized that the negative pressure actuator 100 is operated in a direction where it closes the throttle valve quickly. Subsequently, the CPU proceeds to the step S61 and then returns back to the step S2 after passing through the plural stored reutines.

When the set switch SW5 is turned ON for the first time, it proceeds to the steps S9-S17-S18-S19-S20, whereby a set-on flag SET-ON is set at "1" and the control solenoid controlling duty is set at 5%. Since the control solenoid controlling duty of 5% increases a time rate in which the negative pressure control valve 110 causes the interior of the negative actuator 100 to be communicated with the atmosphere, the negative actuator 110 is moved in a direction where it closes the throttle valve, thus resulting in that the vehicle speed is lowered with the lapse of a time. Actual driving of the control solenoid is performed in accordance with the set duty. In the state that the set switch SW5 is pushed down, the CPU proceeds to the steps S61-S62-S81, .. . while passing through the plural stored routines and further proceeds to the steps S2-S3, . . . S9-S17-S1-8-S61.

When the set switch SW5 is turned OFF, the CPU proceeds to the steps S9-S10-S11-S12-S13-S14, whereby the set-on flag SET-ON is cleared (0) and a set-off flag SET-OFF is set at 1. Subsequently, it comes into the step S61 and now proceeds to the steps S67-S6-8-S69-S70-S80, . . . because the set-off flag SET-OFF is 1, whereby the content of a counter (pointer) RA for specifying the vehicle speed memory is incremented (within a value not greater than 3) and a one-second time for setting is cleared and started. After completion of this processing, the set-off flag SET-OFF is cleared to "0". In other words, execution of the steps S67, S68, S69 and S79 is effected in the first processing timing only where the set switch SW5 was turned OFF. From the next time, it proceeds to the steps S61-S62-S63, .. .

When the set switch SW5 is not turned ON even after the lapse of 1 second from its turning-off, it is detected in the step S63 that the preset time has been out and then the operation is forwarded to S64-S65-S66. Whereby, the content of the target value register R0 is stored into the vehicle speed memory which is specified by the content of the counter RA, a later-described throttle initializing routine is executed and then an operating mode is set to the constant-speed control mode.

On this occasion, since the target value register R0 memories therein a vehicle speed at the time of execution of the step S14, i.e., at the moment when the set switch SW5 was turned OFF, the then vehicle speed is stored into the predetermined memory. When the set switch SW5 repeats its ON/OFF operation two time until it finally comes into the OFF state (1-second turning-off), the processing step of S67-S68-S69-S70 is executed two times during such a period, so that the content of the counter RA becomes 2 and hence the content of the target value register R0 is memorized into the second vehicle speed memory. Since the number of vehicle speed memories is three in this embodiment, the step S67 is provided to prevent the value of the counter RA from exceeding 3). Therefore, even when the set switch SW5 is turned ON/OFF continuously more than three times, the third vehicle speed memory is selected in any case.

Coming into the constant-speed control mode, the CPU proceeds to the steps S40-S41-S42 thereby to repeatedly set the control solenoid controlling duty for each execution of this processing so that the content of the target value register R0, i.e., the memorized vehicle speed becomes equal to the actual vehicle speed. If the set switch SW5 is held in the pushed state, it is continued such a condition that the controlling duty was set at 5% in the step S20, as a result of which the vehicle speed is lowered gradually.

When the resume switch SW6 is turned ON for the first time, the CPU proceeds to S31-S44-S45-S46-S4-7-S48-S43, whereby a resume-on flag RESUME-ON is set to "1" and 0.9-second resume time is cleared and started. Subsequently, it executes the processing loop of S61, . . . S81-S82-S2. If the resume switch SW6 is held in the pushed (ON) state for 0.9 second, the step 48 detects that the preset time has been out, and the operation is forwarded to the step S49 where the control solenoid controlling duty is set at 90%. Since the control solenoid controlling duty of 90% increases a time rate in which the negative pressure control valve 110 causes the interior of the negative pressure actuator 100 to be communicated with a negative pressure source (intake manifold), the negative pressure actuator 110 is moved in a direction where it opens the throttle valve with the lapse of a time. As a result, the vehicle speed is increased.

When the resume switch SW6 is turned OFF, the CPU first proceeds to the steps S31-S32-S33-S34-S3-5-S36, . . . whereby the resume-on flag RESUME-ON is cleared to "0" and a resume-off flag RESUME-OFF is set to "1". If the resume switch SW6 continues to be turned ON for a long time and the 0.9-second timer is timed out, the CPU then proceeds to S36-S37-S38-S39, so that, similarly to that of the ON/OFF operation of the set switch SW5, the present vehicle speed is stored in the target value register R0 and the content of the target value register is memorized in the vehicle speed memory which is specified by the RA. Also, the resume-off flag RESUME-OFF is cleared to "0" to prevent that the normal resume operation will not be performed in the plural stored routines.

If the resume switch SW6 is turned OFF before the 0.9-second timer will be timed out, the CPU proceeds to S81-S87-S88-S89-S90 because the resume-off flag RESUME-OFF is "1", whereby the content of the counter RA is incremented, the 1-second resume timer is cleared and started, and the resume-off flag RESUME-OFF is cleared to "0". The processing step of S81-S87-S88-S89-S90 is executed once during the time the resume-off flag RESUME-OFF assumes "1", i.e., every when the resume switch is changed from the ON state to the OFF state. Thus, the number of times that the resume switch SW6 has been changed from the ON state to the OFF state, is memorized in the counter RA.

When one second has lapsed from turning-off of the resume switch SW6, the CPU proceeds to S81-S82-S8-3-S84-S85-S86 because the 1-second resume timer is timed out, whereby the content of the vehicle speed memory specified by the content of the counter RA, e.g., the content of the third vehicle speed memory in case the resume switch SW6 repeats its ON/OFF operation three times, is stored in the target value register R0. Then, the throttle initialization routine S86 is executed and the constant-speed control mode is set. Coming into the constant-speed control mode, the CPU proceeds to the steps S40-S41-S42-S43, whereby the control solenoid controlling duty is updated so that the present vehicle speed approaches the content of the target value register.

The throttle initialization routine will now be described by referring to FIG. 3e. Briefly stated, this processing is to perform the estimated control (open loop control) for the purpose of quickly driving the negative actuator 100 into a predetermined position (throttle initial opening degree position). More specifically, the control solenoid controlling duty is set at a high value (90%) and a time period to be continued to hold this time is previously calculated in accordance with the content of the target value register R0. This calculated time is set in a timer and the 90% duty control is continued until the preset time is timed out. When timed out, a flag indicating the progress of constant-speed control is set to effect the constant-speed mode.

The external interrupt processing will now be described by referring to FIG. 3d. This processing is to obtain the ON/OFF period of the vehicle speed detecting lead switch SW2. Every when this processing is executed or the SW2 is turned OFF, the counted value of an internal timer is read and then the time is cleared and restarted. If the counted value of the timer is above a predetermined value (i.e., the vehicle speed is below a predetermined level), a low-speed flag is set. When the low-speed flag is set, the CPU proceeds from the step S8 in the main routine to the branched step S15, whereby the constant-speed control speed is released in a similar manner as that when the clutch pedal or the brake pedal is operated.

In the prior art as mentioned above, the electronical control device 10 (FIG. 1) and the actuator 100 (FIG. 2) are constituted separately and arranged on the vehicle dispersedly.

On the other hand, since automatization of vehicles has been advanced and a larger number of various devices are required to be arranged thereon in recent years, there is increased a demand for reduction in the mounting space and the cost. It may be, therefore, proposed to incorporate the actuator and the electronical control circuit into the unitized form. But this method accompanies with a problem of heat-resistant temperature of semiconductor elements used in the electronical control device, because the actuator is disposed in an engine room of the vehicle and the room has a relatively high atmospheric temperature. In other words, since the heat-resistant temperature of semiconductor elements is generally low, it is difficult to mount them directly onto the actuator. Alternatively, semiconductor elements with high heat-resistance may be used to realize such direct mounting, but this results in another problem of the increased cost.

SUMMARY OF THE INVENTION

It is a first object of the present invention to provide an actuator including an electronical control device built therein.

To achieve this object, the present invention is featured in that the electronical control device is disposed in a fluid passage formed in a housing of the actuator.

According to the above arrangement, the electronical control device is interrupted from external heat sources by a fluid passing through the fluid passage. Further, the fluid absorbs and brings away the heat generated by the electronical control circuit itself, so that an increase in temperature of the electronical control circuit due to the self-generating heat can be reduced.

Other objects and features of the present invention will be apparent from the following description of a preferred embodiment with reference to the accompanying drawings.

BRIEF DESCRIPTION OF THE DRAWINGS

FIGS. 3a, 3b, 3c, 3d and 3e are flow charts showing the vehicle speed control operation of the electrical device;

DETAILED DESCRIPTION OF THE INVENTION

Figure 6:
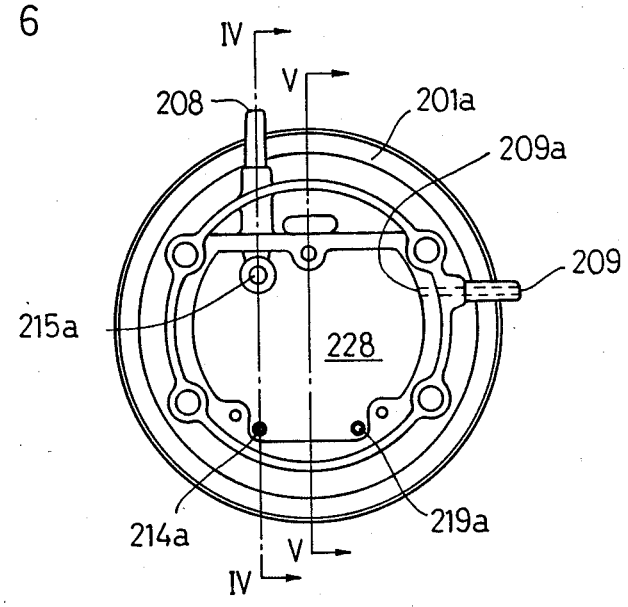
FIG. 6 is a front view showing the housing bottom of the preferred embodiment.
Figure 3A:
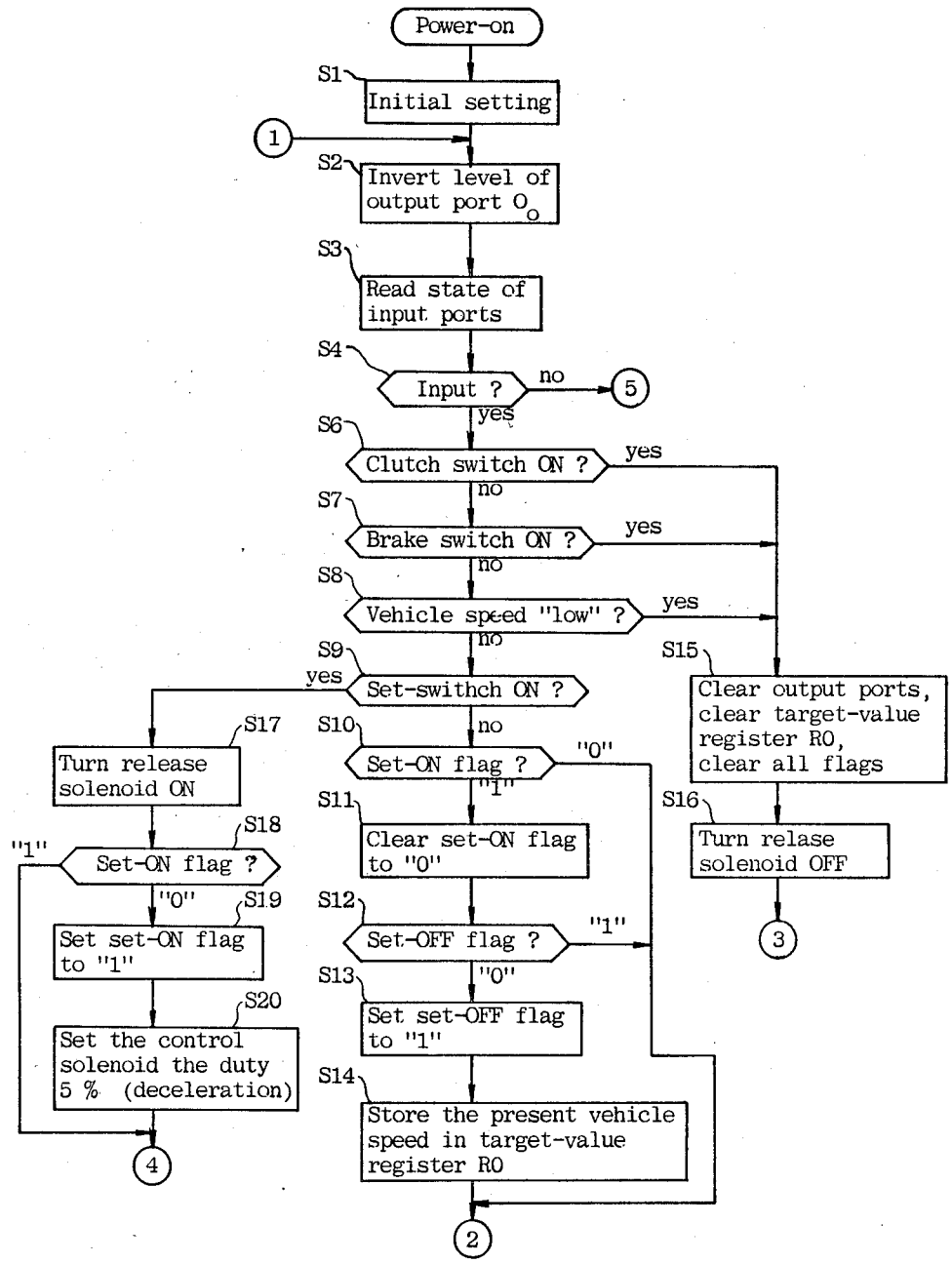
Figure 3C:
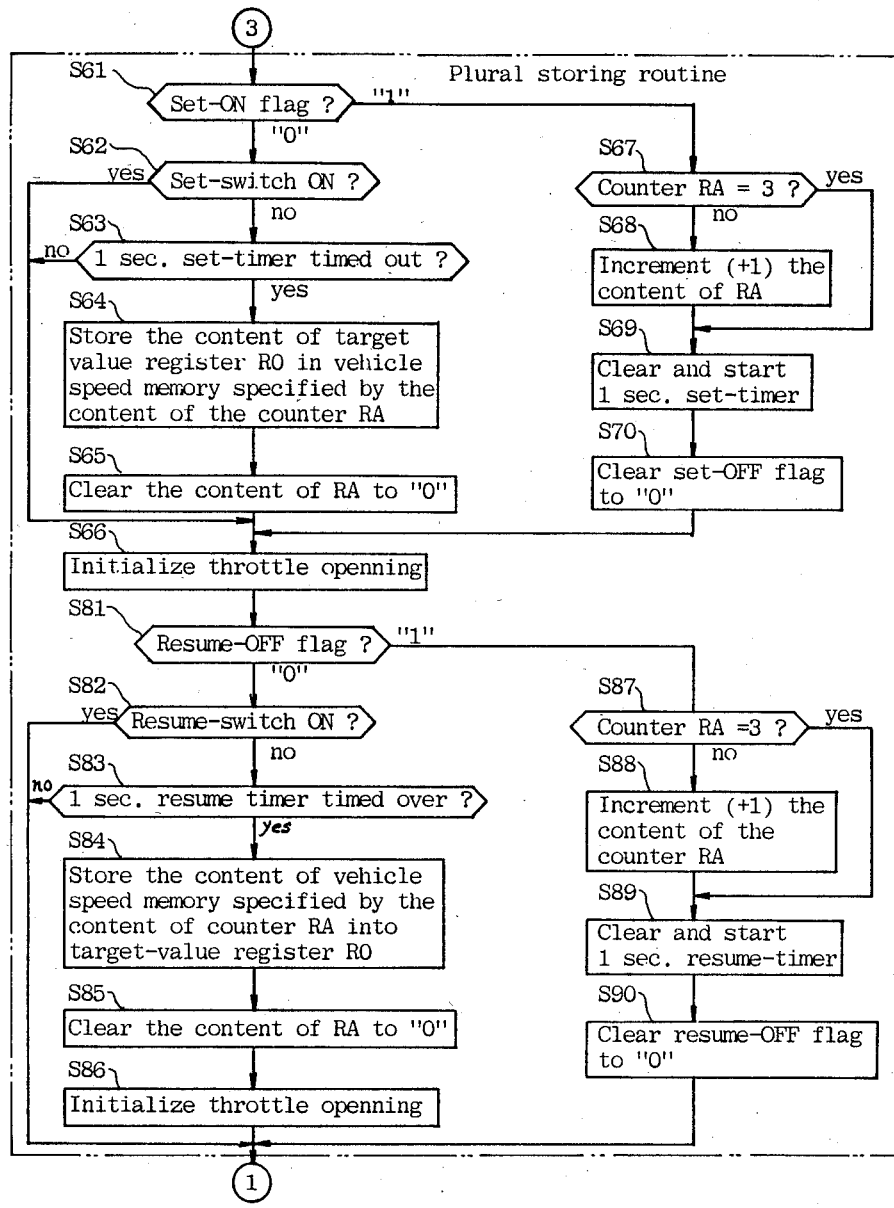
Figure 4:
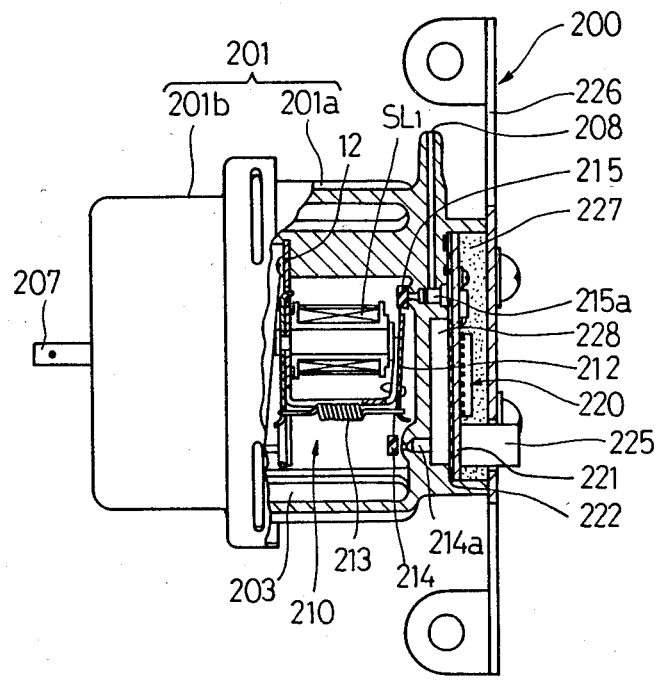
FIG. 4 is a side view of a preferred embodiment of the present invention, with a part being broken away; the broken-away part corresponding to the sectional view taken along the line IV—IV in FIG. 6.
Figure 5:
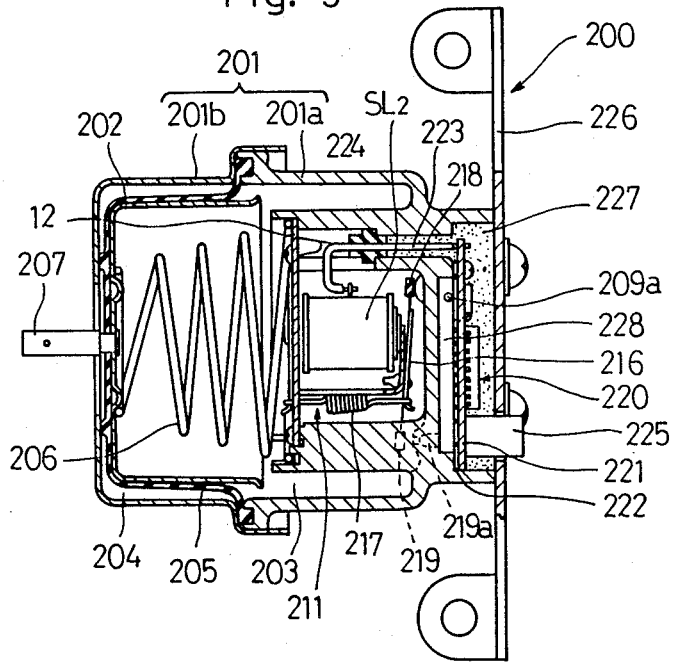
FIG. 5 is a sectional view of the preferred embodiment, i.e., a sectional view taken along the line V—V in FIG. 6.

Referring now to FIGS. 4, 5 and 6 there is shown a preferred embodiment of the present invention, a housing 201 of an actuator 200 comprises a housing base 201a and a housing cover 201b. A diaphragm 202 is held between the confronting flange portions of the base 201a and the cover 201b so as to divide an internal space of the housing 201 into two chambers. A first internal space defined by the diaphragm 202 and the housing base 201a serves as a negative pressure chamber 203, and a second internal space defined by the diaphragm 202 and the housing cover 201b serves as an atmospheric chamber 204 communicating with the atmosphere through an opening (not shown). A piston 205 is fitted to the diaphragm 202, and a compression coil spring 206 is interposed between the piston 205 and a holder plate 12 within the housing base 201a. With this construction, when the pressure in the negative pressure chamber 203 is nearly equal to that in the atmospheric chamber 204, the piston 205 and the diaphragm 202 are pushed into a position as shown in FIG. 5 by a repulsion force of the coil spring. A rod 207 is fixed to the nearly central part of the piston 205, and it extends to penetrate through the cover 201b and is connected to a link of a throttle valve (105). The housing base 201a is provided with a negative pressure port 208 communicating with a negative pressure source, and an atmospheric pressure port 209 communicating with the atmosphere through a filter (not shown).

A negative pressure control valve 210 and a negative pressure release valve 211 both serving as flow rate control valves are fixed to the holder plate 12 in turn fixed to the housing base 201a. The negative control valve 210 includes a movable piece 212 which has one end connected to an extension coil spring 213 and the other end confronting to a control solenoid SL1. Further, valves 214, 215 are fixed to both ends of the movable piece 212, respectively, and in response to magnetization or demagnetization of the solenoid SL1, those valve cause a valve nozzle 215a communicating with the negative pressure port 208 to be opened and a valve nozzle 214a communucating with the atmospheric pressure port 209 to be closed, or cause the valve nozzle 215a to be closed and the valve nozzle 214a to be opened, respectively.

Likewise, the negative pressure release valve 211 comprises a movable piece 216, an extension coil spring 217, a solenoid SL2 and valves 218, 219 fixed to the movable piece 216. The valve 219 makes closing or opening of a valve nozzle 219a in communication with the atmospheric pressure port 209.

Figure 1:
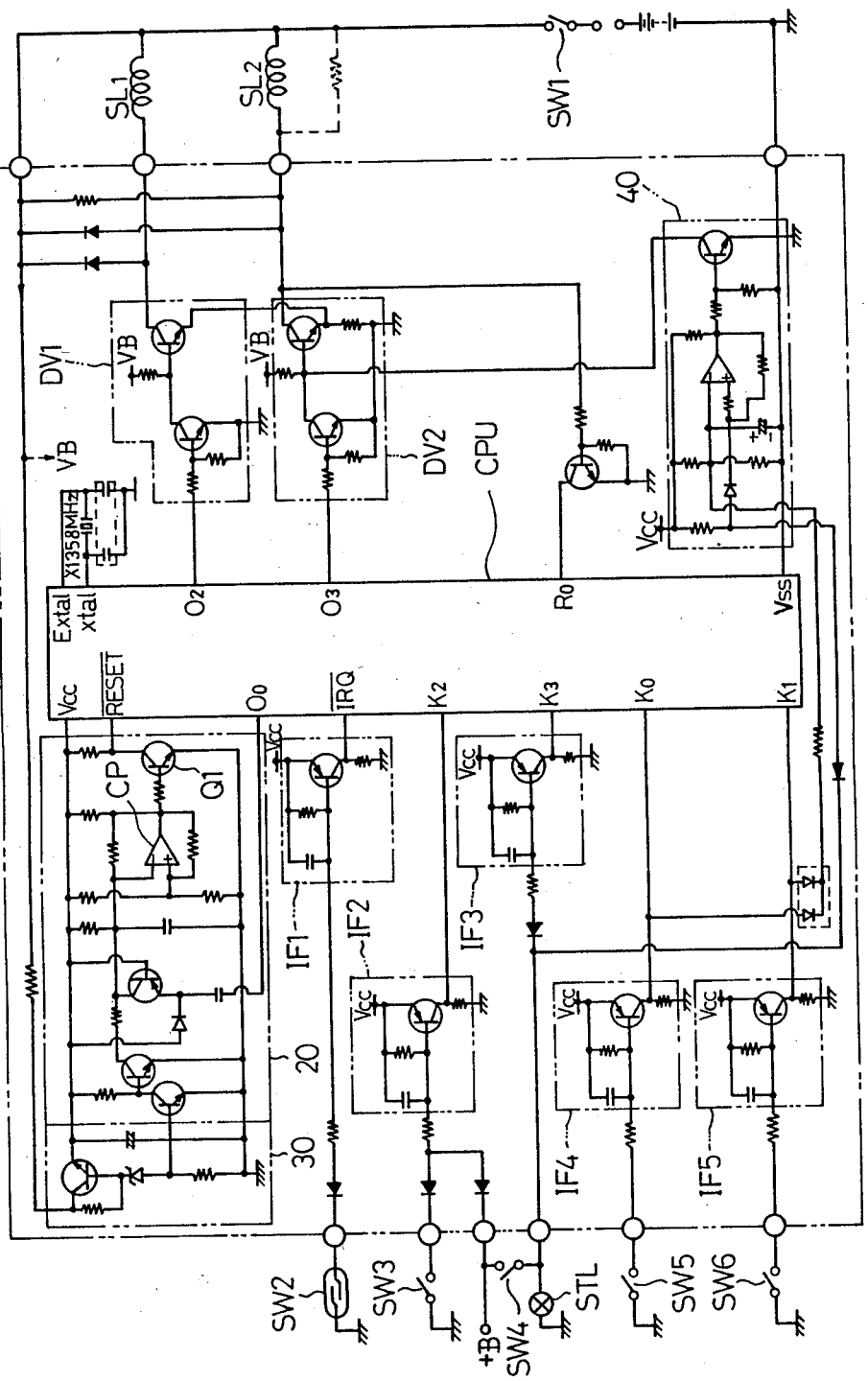
FIG. 1 is a block diagram showing the configuration of a conventional electrical device used in a vehicle speed controller for vehicles.
Figure 2:
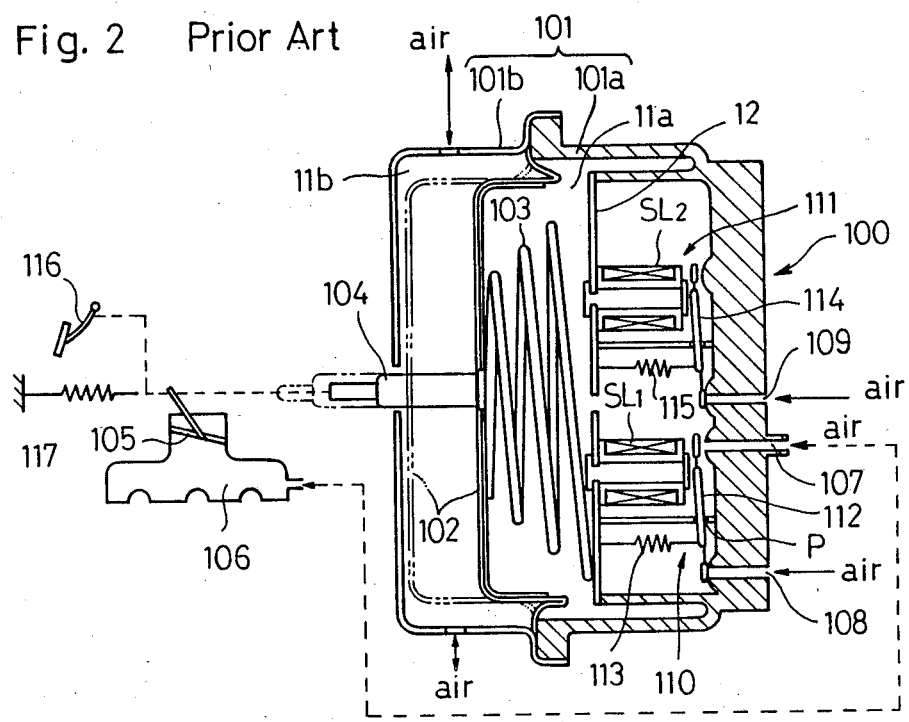
FIG. 2 is a sectional view showing a conventional actuator controlled by the electrical device of FIG. 1.

An electronical control device (corresponding to the part denoted at 10 in FIG. 1) 220 is constituted on a printed board 221, which is fixed to the bottom of the housing base 201a through a gasket 222. To the printed board 221 is connected lead wires 223 which in turn connected to the solenoid SL2 through a grommet 224. Though not shown, lead wires are connected to the solenoid SL1 in a similar way. Further, a connector 225 is fitted to the printed board 221 for electrical connection with the exterior.

A bracket 226 is fixed to the end of the housing base 201a, and a gap between the bracket 226 and the printed board 221 is mold-sealed by an epoxy resin 227 or the like.

A space defined between the bottom of the housing base 201a and the printed board 221 serves as a gas flowing passage 228, the passage 228 being communicated with the atmospheric pressure port 209 and an opening 209a formed in the housing base 201a as well as with the valve nozzles 214a, 219a.

With the construction as mentioned above, the atmosphere introduced from the atmospheric pressure port 209 enters the gas flowing passage 228 through the opening 209a and then flows into the valve nozzles 214a and 219a while absorbing the heat in the circumstance of the electronical control device 220 via the printed circuit 221. As a result, the heat generated by the electronical control device 220 on the printed board 221 can dissipated into the atmosphere.

The printed board 221 may be formed of a ceramic plate.

In the foregoing embodiment, the actuator 200 is controlled by the negative pressure and the gas flowing passage 228 is communicated with the atmospheric pressure port 209. However, as an alternative, such an arrangement is also possible that a compression coil spring is disposed in the second internal space 204 and the negative pressure port 208 is connected to a positive pressure source. Further, the gas flowing passage 228 may be communicated with the negative pressure port 208 and the valve nozzle 215a.

What is claimed is:

1. An actuator comprising a housing including a housing base and a housing cover each having an open end and connected to each other at their respective ends, a diaphragm adapted to divide the interior of said housing into a first internal space adjacent said housing base and a second internal space adjacent said housing cover, an actuator rod fixed to said diaphragm and extending through said housing, spring means adapted to push said diaphragm in a direction where one of said first and second internal spaces is increased and the other internal space is decreased, a printed circuit board having solenoid control circuit means thereon secured to said housing base and defining a third internal space between said printed circuit board and said housing base, first fluid pressure port means for imparting a first fluid pressure outside of said housing to said first internal space, second fluid pressure port means for imparting a second fluid pressure outside of said housing to said third space, third fluid pressure port means communicating said first internal space with said third space and solenoid valve means mounted in said housing for controlling communication of fluid pressure through said first and third pressure port means.

2. An actuator as set forth in claim 1 wherein said actuator rod extends through an opening in said housing cover and said spring means is disposed in said first internal space between said diaphragm and said housing base.

3. An actuator as set forth in claim 2 wherein said first fluid pressure port means is adapted to be connected to a negative pressure source outside of said housing and said second fluid pressure port means connects said third space with atmospheric pressure outside of said housing and wherein said solenoid valve means controls the flow of air through said third space whereby the air flowing through said third space in contact with said printed circuit board will dissipate heat associated with said printed circuit board.

* * * * *